(12) United States Patent
Kishiyama et al.

(10) Patent No.: US 8,223,816 B2
(45) Date of Patent: Jul. 17, 2012

(54) SIGNAL SEQUENCE GENERATING METHOD, CONTROL INFORMATION GENERATING APPARATUS AND USER EQUIPMENT TERMINAL

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 107 days.

(21) Appl. No.: 12/681,164

(22) PCT Filed: Sep. 29, 2008

(86) PCT No.: PCT/JP2008/067673
§ 371 (c)(1),
(2), (4) Date: Jun. 8, 2010

(87) PCT Pub. No.: WO2009/044708
PCT Pub. Date: Apr. 9, 2009

(65) Prior Publication Data
US 2010/0272152 A1    Oct. 28, 2010

(30) Foreign Application Priority Data

Oct. 1, 2007 (JP) .................. 2007-258111

(51) Int. Cl.
*H04B 1/00* (2006.01)
(52) U.S. Cl. ........ 375/130; 375/132; 375/140; 375/259; 375/260
(58) Field of Classification Search .......... 375/130, 375/132, 133, 138, 140, 295, 260; 370/330, 370/344, 329; 714/748
See application file for complete search history.

(56) References Cited

U.S. PATENT DOCUMENTS

| 6,078,609 | A | 6/2000 | Nago |
| 7,848,448 | B2 * | 12/2010 | Han et al. ................ 375/295 |
| 2005/0078737 | A1 * | 4/2005 | Craig et al. ............... 375/132 |
| 2007/0133462 | A1 * | 6/2007 | Guey ....................... 370/330 |
| 2009/0060004 | A1 * | 3/2009 | Papasakellariou et al. ... 375/140 |
| 2010/0135273 | A1 * | 6/2010 | Kim ......................... 370/344 |

FOREIGN PATENT DOCUMENTS

| JP | 07-162393 | A | 6/1995 |
| JP | 09-102980 | A | 4/1997 |
| JP | 09-172394 | A | 6/1997 |
| JP | 10-065648 | A | 3/1998 |
| WO | 2006/113873 | A2 | 10/2006 |

OTHER PUBLICATIONS

International Search Report w/translation from PCT/JP2008/067673 dated Dec. 22, 2008 (5 pages).
Written Opinion from PCT/JP2008/067673 dated Dec. 22, 2008 (3 pages).
3GPP TR 25.814 V7.0.0; Physical layer aspects for evolved Universal Terrestrial Radio Access (UTRA); Sep. 2006 (126 pages).
Mexican Office Action for Application No. MX/a/2010/003629, mailed on Sep. 26, 2011 (4 pages).

* cited by examiner

*Primary Examiner* — Shuwang Liu
*Assistant Examiner* — Ross Varndell
(74) *Attorney, Agent, or Firm* — Osha Liang LLP

(57) ABSTRACT

A signal sequence generating method of generating a signal sequence used by a user equipment terminal in a mobile communication system includes the steps of generating, by a base station, a predetermined hopping pattern; generating, by the base station, a hopping sequence by applying an offset to the predetermined hopping pattern; transmitting, by the base station, the hopping sequence to the user equipment terminal; and generating, by the user equipment terminal, the signal sequence according to the hopping sequence.

6 Claims, 11 Drawing Sheets

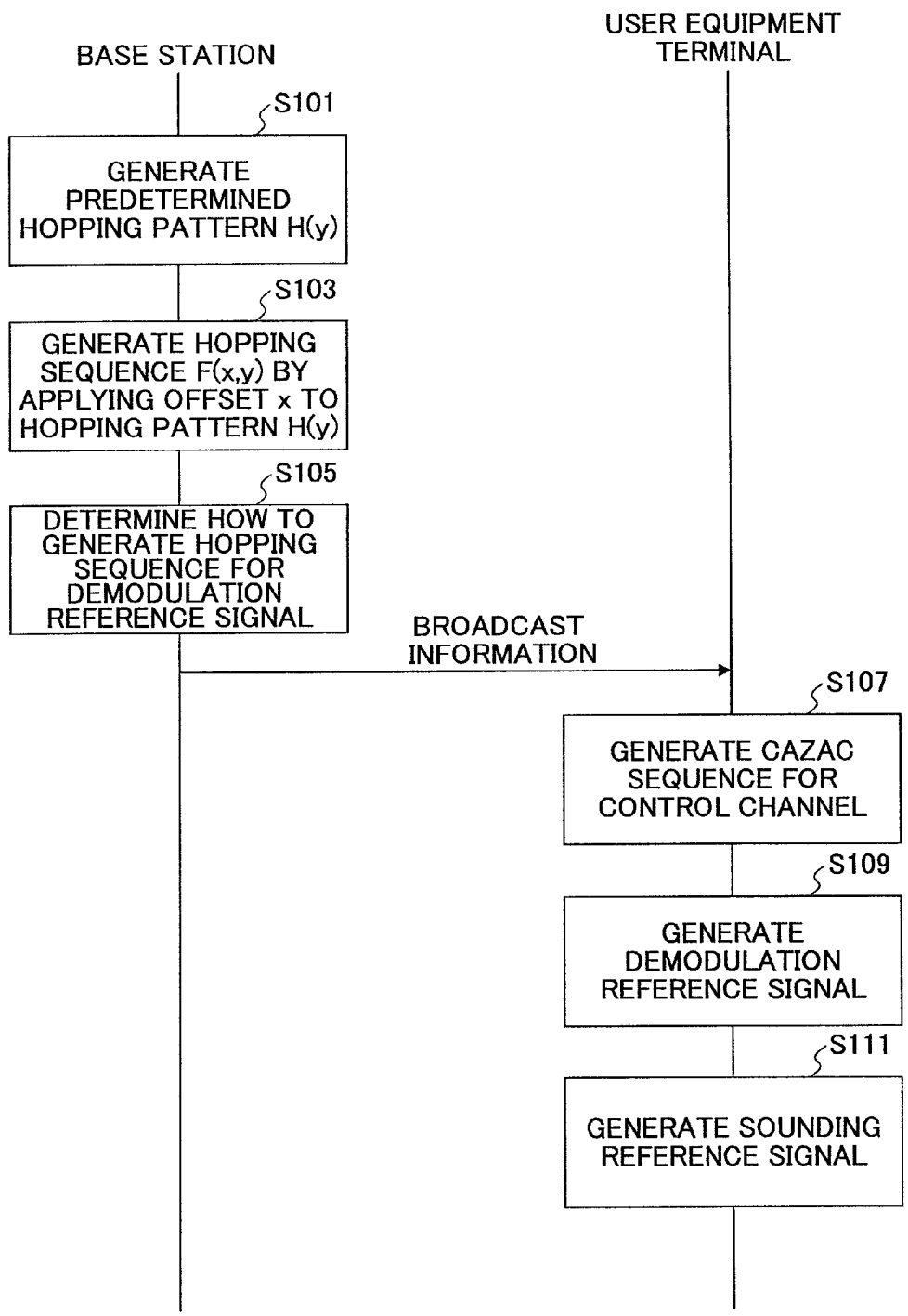

SIGNAL SEQUENCE GENERATING METHOD, CONTROL INFORMATION GENERATING APPARATUS AND USER EQUIPMENT TERMINAL

TECHNICAL FIELD

The present invention relates to a signal sequence generating method, a control information generating apparatus, and a user equipment terminal.

BACKGROUND ART

As a next-generation system of the W-CDMA (Wideband Code Division Multiple Access) system and the HSDPA (High Speed Downlink Packet Access) system, an LTE (Long Term Evolution) system has been studied by the standards body referred to as 3GPP (3rd Generation Partnership Project). In the LTE system, a single carrier scheme (SC-FDMA: Single-Carrier Frequency Division Multiple Access) has been studied to be applied to uplink communications (see 3GPP TR 25.814 (V7.0.0), "Physical Layer Aspects for Evolved UTRA", June 2006, for example).

A control channel and a data channel are multiplexed into the uplink communication channel. Further, a Demodulation Reference Signal and a Sounding Reference Signal are transmitted on the uplink communication channel.

The use of a signal sequence or a signal sequence group, such as a CAZAC (Constant Amplitude Zero Auto-Correlation) sequence or a CAZAC sequence group with a better auto-correlation property, for the control channel, the Demodulation Reference Signal, and the Sounding Reference Signal has been discussed. The CAZAC sequence includes a Zadoff-Chu sequence and a CG-CAZAC sequence.

DISCLOSURE OF INVENTION

Problem(s) to be Solved by the Invention

Assignment of a CAZAC sequence (or CAZAC sequence group) to each cell is designed such that the same CAZAC sequence or the same CAZAC sequence group is not used in adjacent cells, as shown in FIG. 1. The use of different CAZAC sequences or different CAZAC sequence groups in adjacent cells can reduce inter-cell interference.

In FIG. 1, different CAZAC sequences among seven CAZAC sequences (G1-G7) are assigned to adjacent cells. According to this assignment, interference among cells is eliminated. However, it is necessary to re-assign CAZAC sequences upon changes in the cell configuration.

It is a general object of the present invention to efficiently assign a CAZAC sequence to each cell.

Means for Solving the Problem(s)

In one aspect of the present invention, there is provided a signal sequence generating method of generating a signal sequence used by a user equipment terminal in a mobile communication system, including the steps of:

generating, by a base station, a predetermined hopping pattern;

generating, by the base station, a hopping sequence by applying an offset to the predetermined hopping pattern;

transmitting, by the base station, the hopping sequence to the user equipment terminal; and generating, by the user equipment terminal, the signal sequence according to the hopping sequence.

In another aspect of the present invention, there is provided a control information generating apparatus for generating control information used for generating a signal sequence used by a user equipment terminal in a mobile communication system, including:

a hopping pattern generating unit configured to generate a predetermined hopping pattern;

a hopping sequence generating unit configured to generate a hopping sequence by applying an offset to the predetermined hopping pattern; and a transmitting unit configured to transmit the hopping sequence as the control information to the user equipment terminal.

In another aspect of the present invention, there is provided a user equipment terminal for generating a signal sequence for a control channel, a signal sequence for a Demodulation Reference Signal, and a signal sequence for a Sounding Reference Signal in a mobile communication system, including:

a control channel signal sequence generating unit configured to generate the signal sequence for the control channel according to a hopping sequence generated by applying an offset to a predetermined hopping pattern;

a Demodulation Reference Signal sequence generating unit configured to generate the signal sequence for the Demodulation Reference Signal according to a sequence formed by puncturing the hopping sequence; and a Sounding Reference Signal sequence generating unit configured to generate the signal sequence for the Sounding Reference Signal according to a sequence formed by puncturing the hopping sequence.

Advantageous Effect of the Invention

According to an embodiment of the present invention, a CAZAC sequence can be efficiently assigned to each cell.

BRIEF DESCRIPTION OF THE DRAWINGS

FIG. 12 shows a flowchart of a method of generating a hopping pattern in accordance with an embodiment of the present invention.

DETAILED DESCRIPTION OF THE PREFERRED EMBODIMENTS

Figure 1:
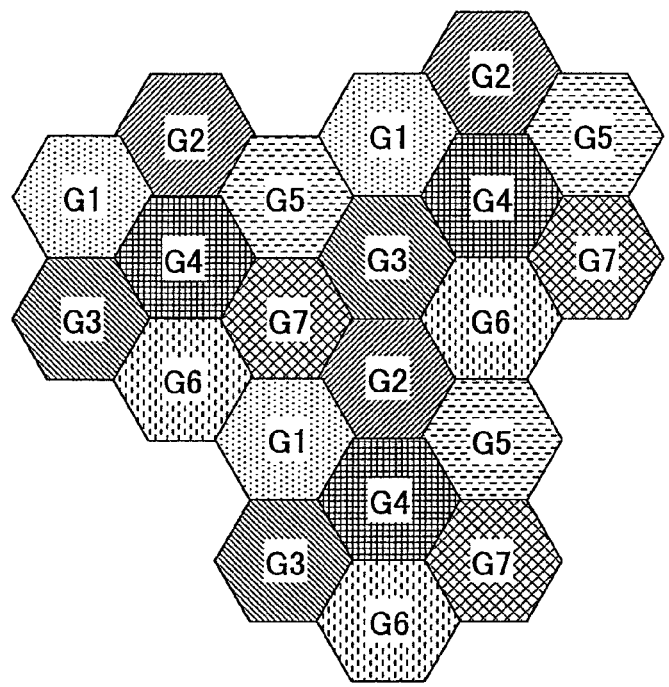
FIG. 1 shows an example of assignment of a CAZAC sequence to each cell.

Description of Notations 10 base station
101 hopping pattern generating unit
103 hopping sequence generating unit
105 broadcast channel transmitting unit
20 user equipment terminal
201 broadcast channel receiving unit
203 control channel CAZAC sequence generating unit
205 Demodulation Reference Signal generating unit
207 Sounding Reference Signal generating unit
209 data multiplexing unit
211 multiplex control unit

BEST MODE OF CARRYING OUT THE INVENTION

With reference to the accompanying drawings, a description is given below with regard to embodiments of the present invention.

Figure 2:
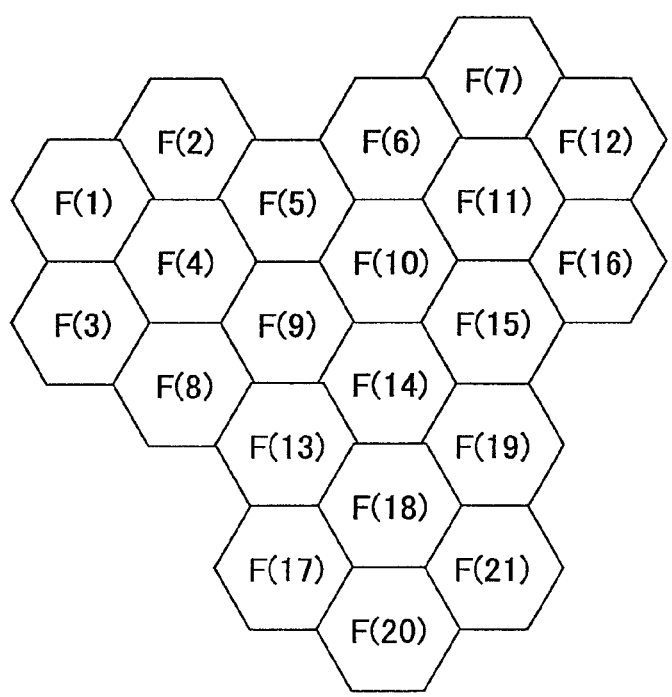
FIG. 2 shows an example of assignment of a hopping sequence to each cell in accordance with an embodiment of the present invention.

In the present invention, as shown in FIG. 2, a CAZAC sequence used in each cell is selected according to hopping sequences F(1)-F(21).

For example, the hopping sequences are defined as sequences having random values as follows.

F(1)={1, 3, 2, 6, 4, 1, 4, 5, 2, ... }
F(2)={3, 4, 1, 5, 6, 2, 5, 3, 2, ... }

In the cell to which the hopping sequence F(1) is applied, CAZAC sequences are used in the order of a first CAZAC sequence, a third CAZAC sequence, a second CAZAC sequence, a sixth CAZAC sequence, a fourth CAZAC sequence, and so on. In the cell to which the hopping sequence F(2) is applied, CAZAC sequences are used in the order of the third CAZAC sequence, the fourth CAZAC sequence, the first CAZAC sequence, a fifth CAZAC sequence, the sixth CAZAC sequence, and so on.

Hopping of six types of CAZAC sequences in this manner allows different hopping sequences to be assigned to various cells. For example, the second CAZAC sequence is selected at the ninth timing in both the cell to which the hopping sequence F(1) is applied and the cell to which the hopping sequence F(2) is applied, which may result in interference. However, no interference occurs at the first through eighth timings, since different hopping patterns are used. As used herein, the hopping pattern of CAZAC sequences such as F(1) and F(2) is called the hopping sequence.

Selecting a CAZAC sequence according to the hopping sequence in this manner allows the CAZAC sequence to be efficiently assigned to each cell.

<Method of Generating a Hopping Sequence>

Figure 3:
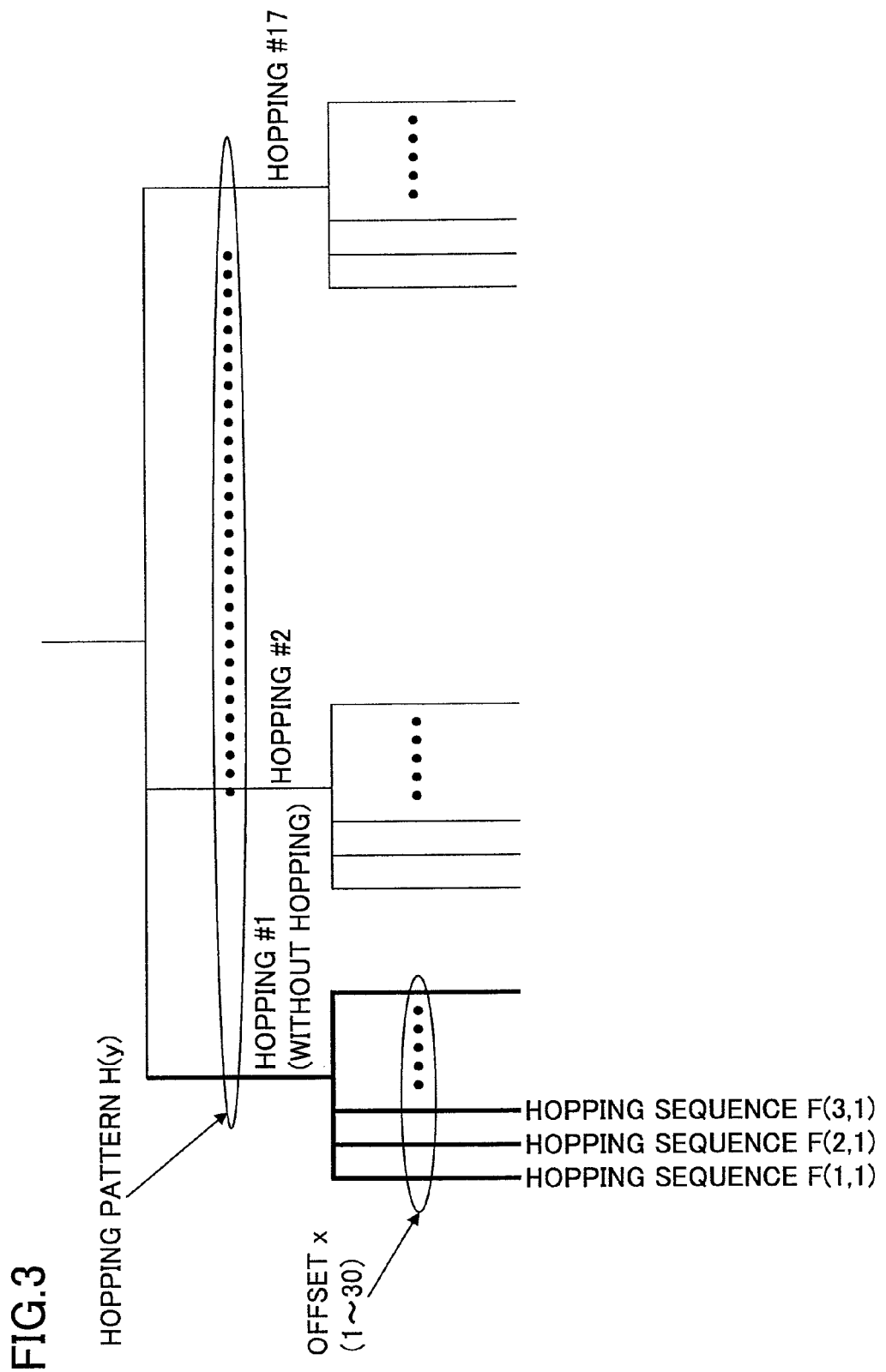
FIG. 3 shows a conceptual diagram of a method of generating a hopping sequence in accordance with an embodiment of the present invention.
Figure 4:
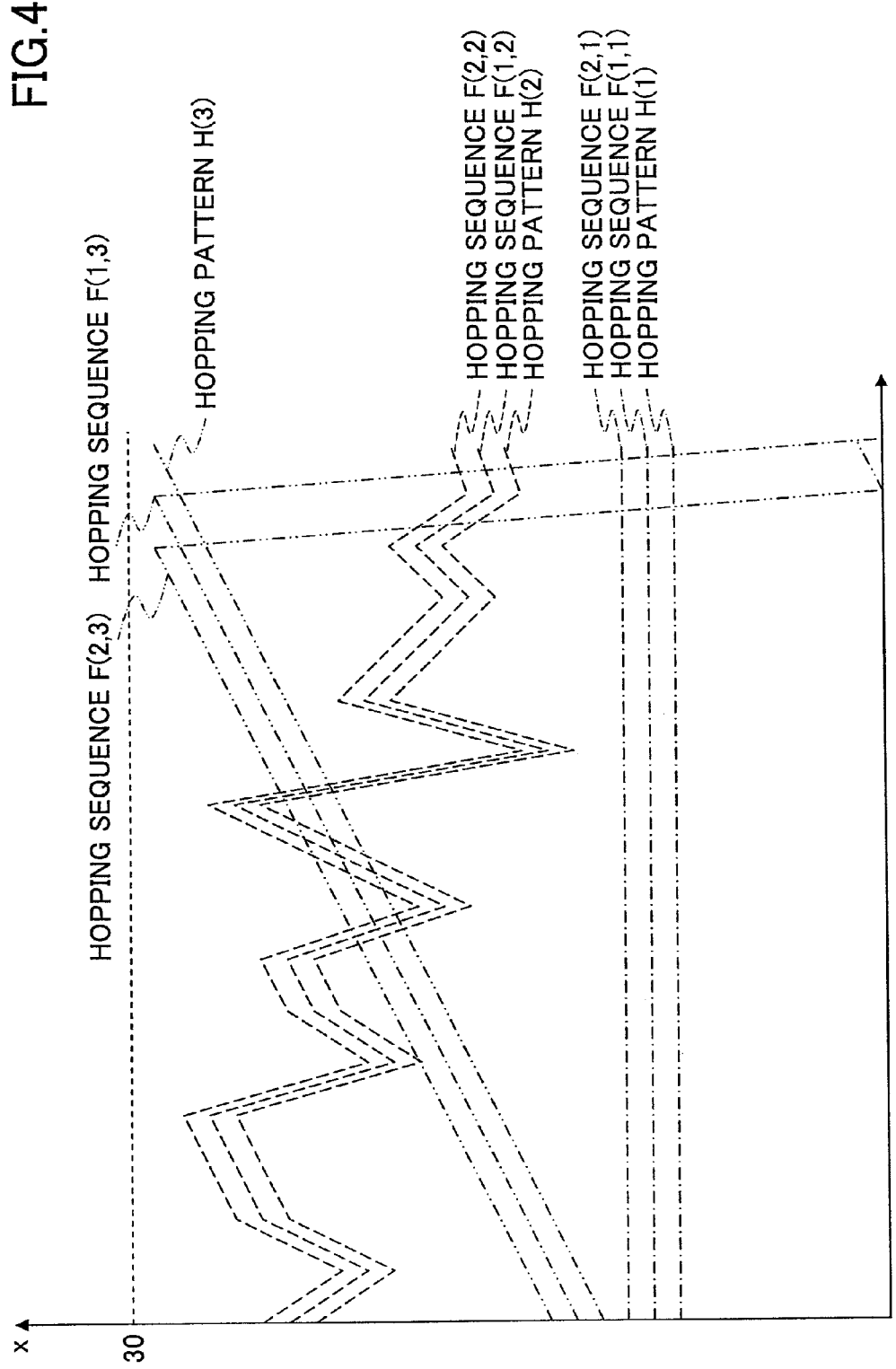
FIG. 4 shows an example of hopping sequences in accordance with an embodiment of the present invention.

With reference to FIGS. 3 and 4, a method of generating a hopping sequence is described below.

The hopping sequence is generated by generating an arbitrary hopping pattern H(y) and applying an offset 'x' (shift amount) to the hopping pattern H(y).

The hopping pattern H(y) is defined as follows:

$$H(y)=\{h_{y,1}, h_{y,2}, h_{y,3}, h_{y,N}\}$$

where 'y' is a hopping pattern index and 'N' is the length of the hopping sequence. '$h_{y,1}$', '$h_{y,2}$', '$h_{y,3}$', . . . , '$h_{y,N}$' are selected among integers corresponding to the number of available CAZAC sequence types. For example, when thirty types of CAZAC sequences are available, '$h_{y,1}$', '$h_{y,2}$', '$h_{y,3}$', . . . , '$h_{y,N}$' is arbitrarily selected from integers 0-29. This hopping pattern includes a pattern with the same CAZAC sequence on all occasions (a pattern without hopping), such as H(1)={1, 1, 1, . . . , 1}.

A hopping sequence F(x,y) is defined by applying an offset 'x' to the hopping pattern H(y) as follows:

$$F(x,y)=\{(h_{y,1}+x)\bmod(X),(h_{y,2}+x)\bmod(X),(h_{y,3}+x)\bmod(X),\ldots,(h_{y,N}+x)\bmod(X)\}$$

where 'x' is the offset and 'X' is the number of available CAZAC sequence types. For example, when thirty types of CAZAC sequences are available, X=30 and 'x' is arbitrarily selected from integers 1-30.

For example, assuming that thirty types of CAZAC sequences are available, when seventeen hopping patterns H(1)-H(17) are defined, 30*17=510 types of hopping sequences F(1,1)-F(30,17) corresponding to the number of cell IDs can be generated. Since many hopping sequences can be used, assignment of the hopping sequences to cells can be simplified. Specifically, by associating the hopping sequences to cell IDs, a CAZAC sequence can be easily assigned to each cell.

FIG. 4 shows an example of hopping sequences generated in this manner.

For example, when thirty types of CAZAC sequences are available, a hopping pattern is generated using an integer which is arbitrarily selected from 0-29.

H(1)={7,7,7,7,7,7,7,7,7,7,7,7,7,7,7,7,7}
H(2)={22,19,24,25,26,17,20,21,18,25,12, 21,17,14,15,12,13}
H(3)={13,14,15,16,17,18,19,20,21,22,23, 24,25,26,27,28,29}

Hopping sequences F(1,1)-F(30,1) can be generated as follows by applying offsets 1-30 to the hopping pattern H(1).

F(1,1)={8,8,8,8,8,8,8,8,8,8,8,8,8,8,8,8, 8}
F(2,1)={9,9,9,9,9,9,9,9,9,9,9,9,9,9,9,9, 9}

Similarly, hopping sequences F(3,1)-F(30,1) can be generated. It should be noted that F(23,1)={0,0,0,0,0,0,0,0,0,0, 0,0,0,0,0,0,0} due to modulo arithmetic.

Hopping sequences F(1,2)-F(30,2) can be generated as follows by applying offsets 1-30 to the hopping pattern H(2).

F(1,2)={23,20,25,26,27,18,21,22,19,26,13, 22,18,15,16,13,14}
F(2,2)={24,21,26,27,28,19,22,23,20,27,14, 23,19,16,17,14,15}

Similarly, hopping sequences F(3,2)-F(30,2) can be generated.

Hopping sequences F(1,3)-F(30,3) can be generated as follows by applying offsets 1-30 to the hopping pattern H(3).

F(1,3)={14,15,16,17,18,19,20,21,22,23,24, 25,26,27,28,29,0}
F(2,3)={15,16,17,18,19,20,21,22,23,24,25, 26,27,28,29,0,1}

Similarly, hopping sequences F(3,3)-F(30,3) can be generated.

<Method of Applying a Hopping Sequence to Each Cell>

Figure 5:
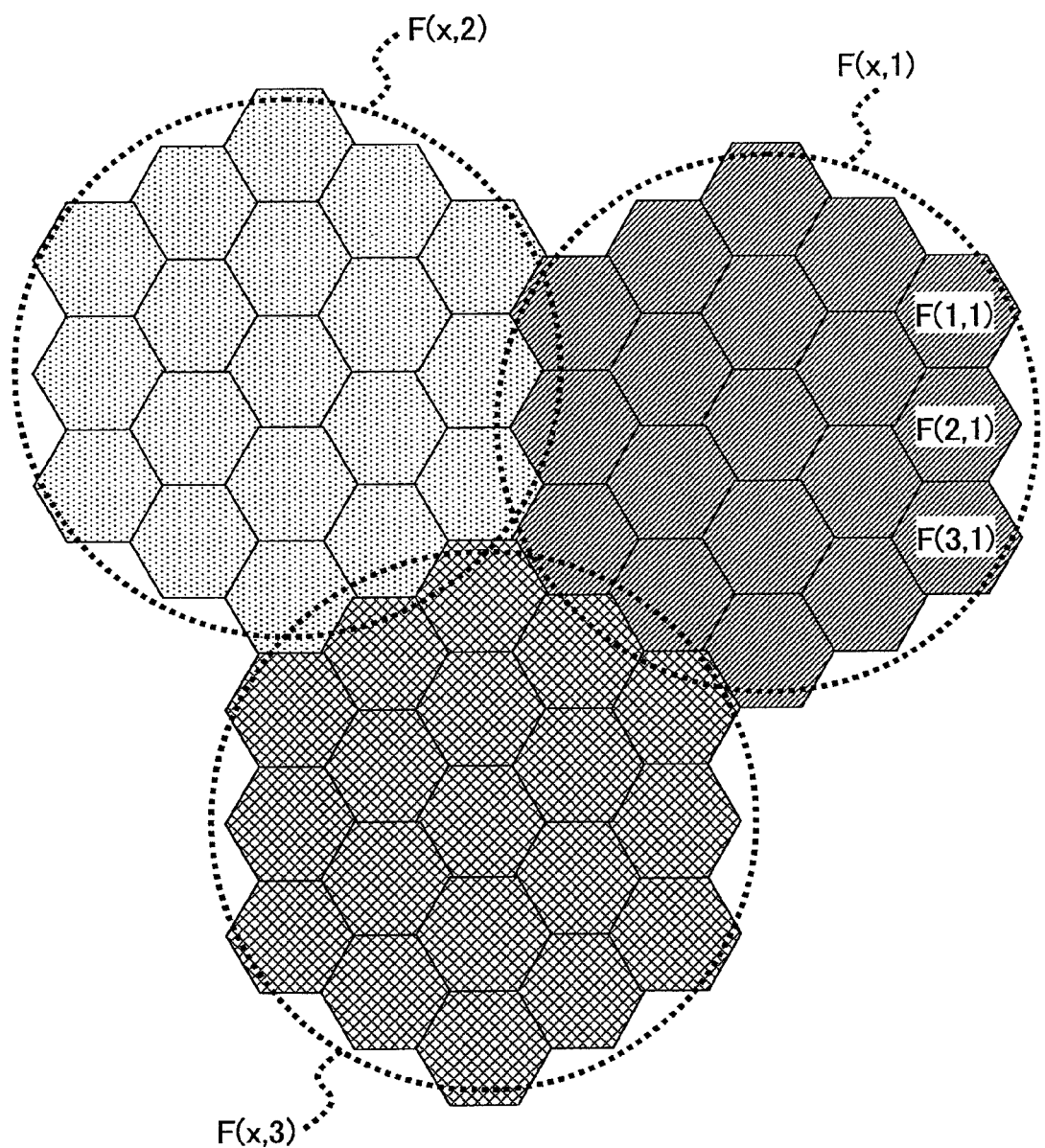
FIG. 5 shows a conceptual diagram of a method of applying a hopping sequence to each cell in accordance with an embodiment of the present invention.

When a hopping sequence is applied to each cell, cells may be grouped as shown in FIG. 5. Specifically, while the same hopping pattern is applied to respective cells in the same group, hopping sequences with different offsets are applied to the cells in the same group.

For example, since the offsets are different in the cell to which the hopping sequence F(1,1) is applied and the cell to which the hopping sequence F(2,1) is applied, different CAZAC sequences are used in these cells at all times. As a result, interference in the group can be eliminated, and thus interference from adjacent cells can be reduced.

Grouping may be modified based on the amount of traffic. For example, cells with a large amount of traffic belonging to the same group can reduce interference among cells with a large amount of traffic.

Further, when hopping is not needed, the hopping may not be used. For example, when the base station transmits one bit of broadcast information, all the groups can switch to a pattern without hopping.

<Method of Generating a Demodulation Reference Signal, a Sounding Reference Signal, and a CAZAC Sequence for a Control Channel>

Figure 6:
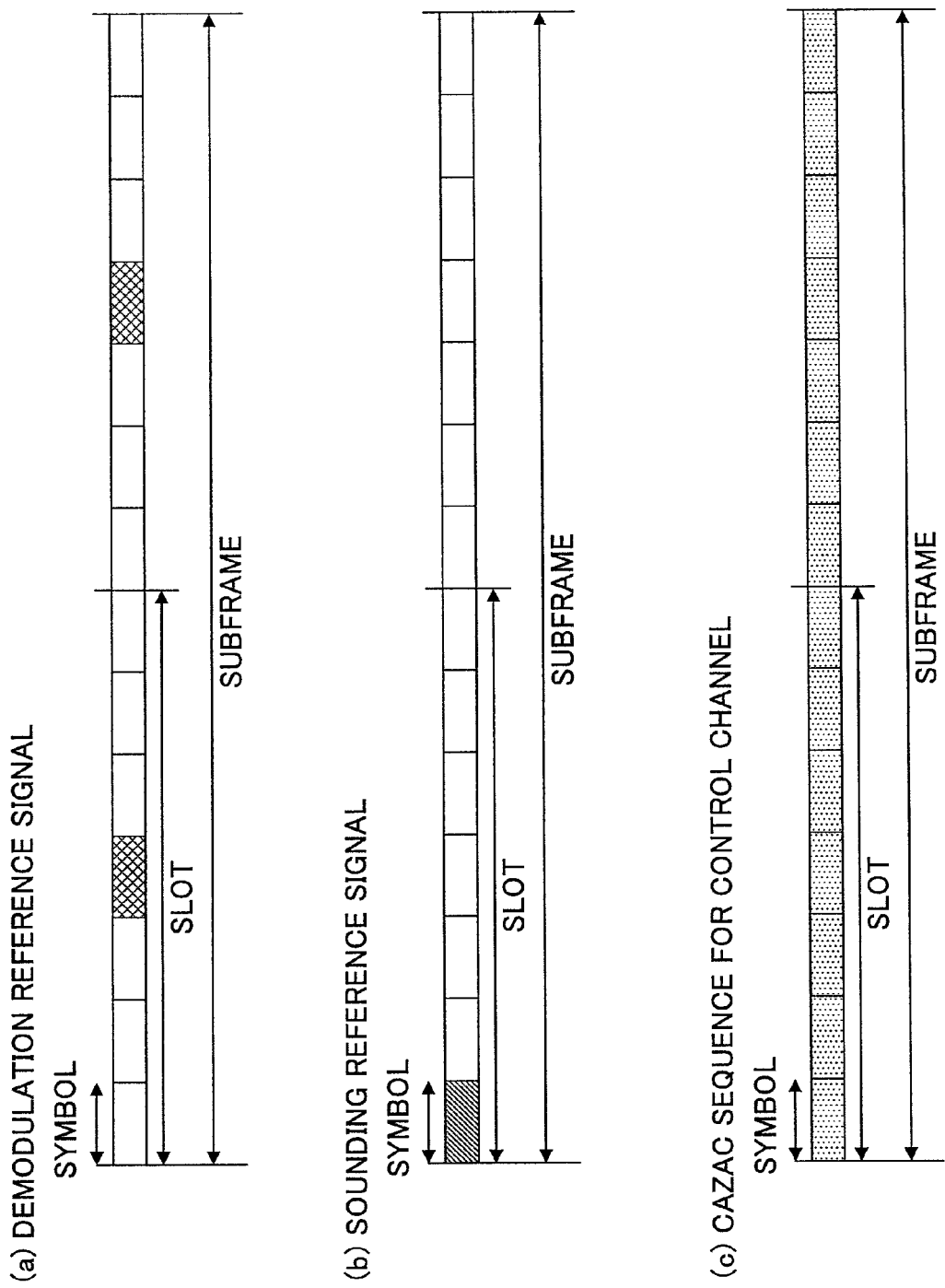
FIG. 6 shows a time-relationship between a Demodulation Reference Signal, a Sounding Reference Signal, and a control channel.

CAZAC sequences are used for a Demodulation Reference Signal, a Sounding Reference Signal, and a control channel. These signals have a time-relationship shown in FIG. 6. As shown in FIG. 6, the Demodulation Reference Signal is transmitted at every slot, the Sounding Reference Signal is transmitted at every subframe, and the control channel is transmitted at every symbol. For this reason, a CAZAC sequence with hopping at every slot may be used for the Demodulation Reference Signal, a CAZAC sequence with hopping at every subframe may be used for Sounding Reference Signal, and a CAZAC sequence with hopping at every symbol may be used for the control channel.

Figure 7:
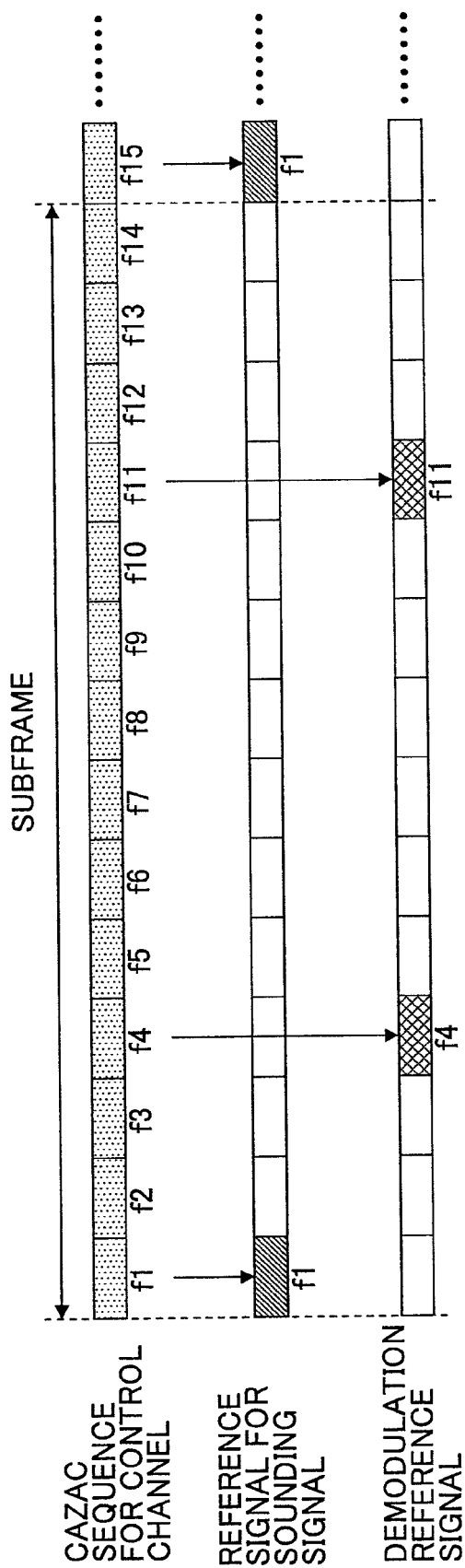
FIG. 7 shows a conceptual diagram illustrating a relationship when a hopping sequence is applied to a Demodulation Reference Signal, a Sounding Reference Signal, and a control channel in accordance with an embodiment of the present invention.

In order to efficiently generate hopping sequences for them, the hopping sequence described with reference to FIGS. 3 and 4 may be used as the hopping sequence for the control channel. As shown in FIG. 7, since one slot includes seven symbols, the hopping sequence for the control channel may be punctured (thinned out) by one-seventh (1/7) for the use of the hopping sequence for the Demodulation Reference Signal. Similarly, since one subframe includes fourteen symbols, the hopping sequence for the control channel may be punctured (thinned out) by one-fourteenth (1/14) for the use of the hoping sequence for the Sounding Reference Signal. In this manner, hopping sequences can be efficiently generated.

Figure 8:
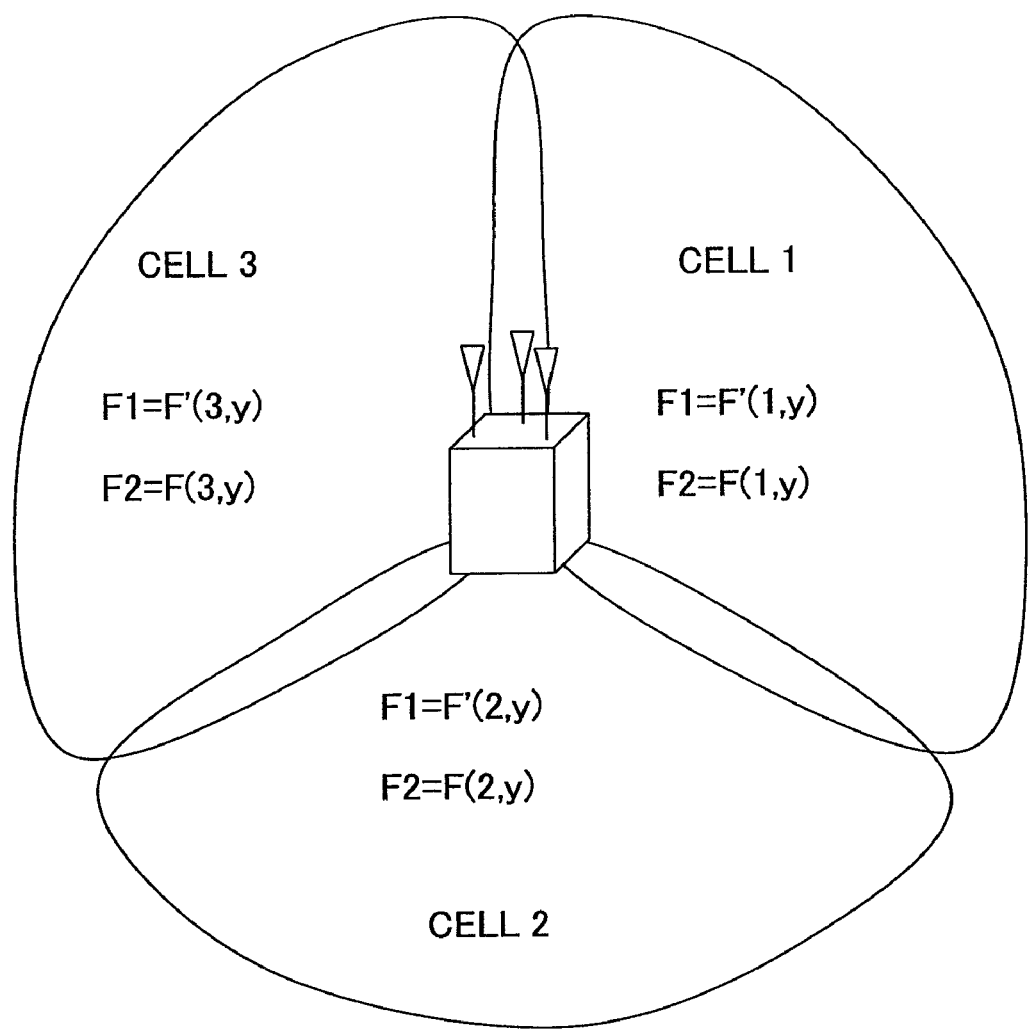
FIG. 8 shows a first conceptual diagram of a method of generating a hoping sequence for a Demodulation Reference Signal in the case of a three-sector configuration.

FIG. 8 shows a conceptual diagram in which the hopping sequence for the Demodulation Reference Signal is generated when the base station has a three-sector configuration.

When the hopping sequence F2 for the control channel in the cell 1 (or sector 1) is F(1,y), the hopping sequence F1 for the Demodulation Reference Signal may be F'(1,y), which is formed by puncturing the hopping sequence F(1,y) by one-seventh (1/7). Similarly, the hopping sequence for the Demodulation Reference Signal can be generated in each of cells 2 and 3.

Figure 9:
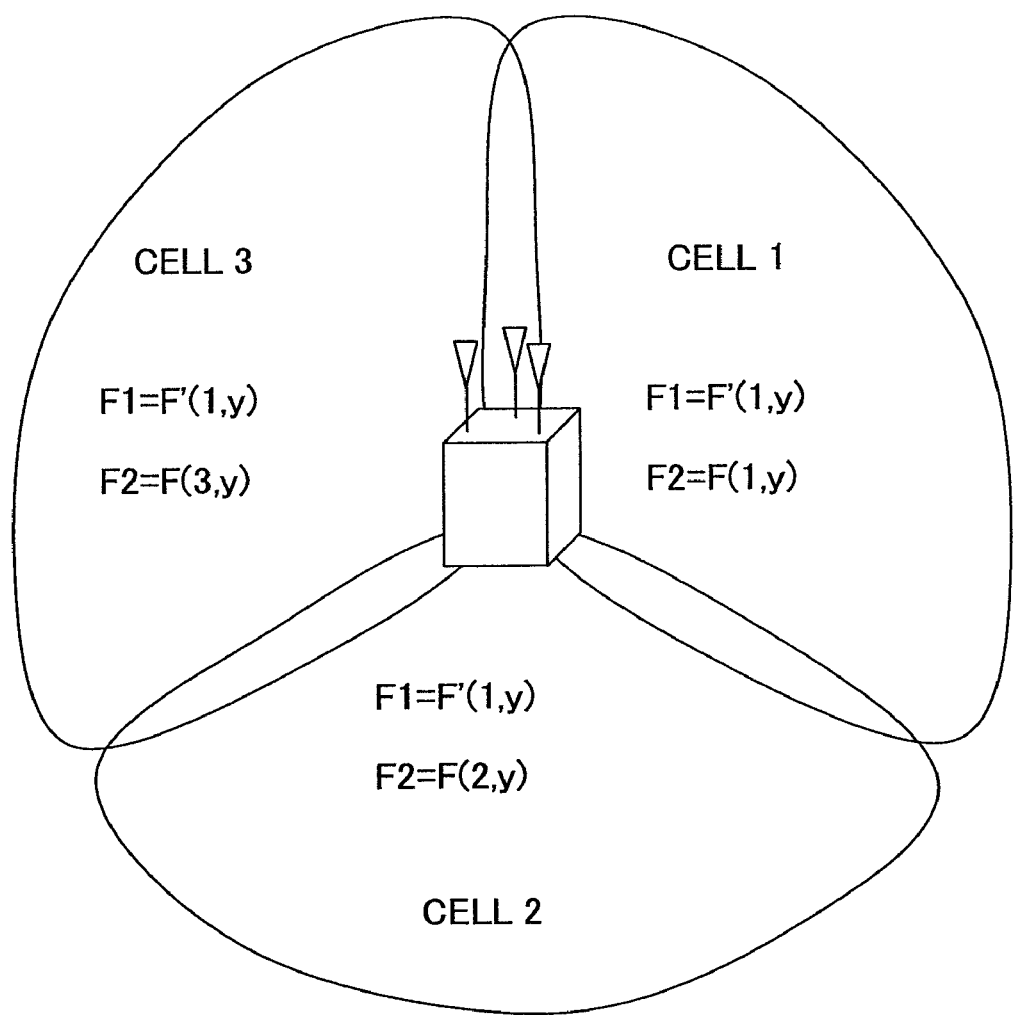
FIG. 9 shows a second conceptual diagram of a method of generating a hoping sequence for a Demodulation Reference Signal in the case of a three-sector configuration.

Alternatively, when orthogonalization is achieved by cyclic-shifting a CAZAC sequence, the same hopping sequence F1 for the Demodulation Reference Signal may be generated among the cells (sectors) in the same base station, as shown in FIG. 9. For example, the hopping sequence F1 for the Demodulation Reference Signal is formed as follows by puncturing the hopping sequence F2=F(x,y) for the control channel by one-seventh (1/7):

$$F1 = F'(int[(x-1)/N]+1, y)$$

where N is the number of sectors.

For example, when the hopping sequence F'(1,y) for the Demodulation Reference Signal is generated from the hopping sequence F(1,y) for the control channel in the cell 1, the same hopping sequence F'(1,y) may be used in the cells 2 and 3. The use of the same hopping sequence for the Demodulation Reference Signal in this manner means the use of the same CAZAC sequence for the Demodulation Reference Signal in the base station. The use of the same CAZAC sequence for the Demodulation Reference Signal can improve the accuracy of channel estimation at the sector boundary.

<Configuration of a Base Station>

Figure 10:
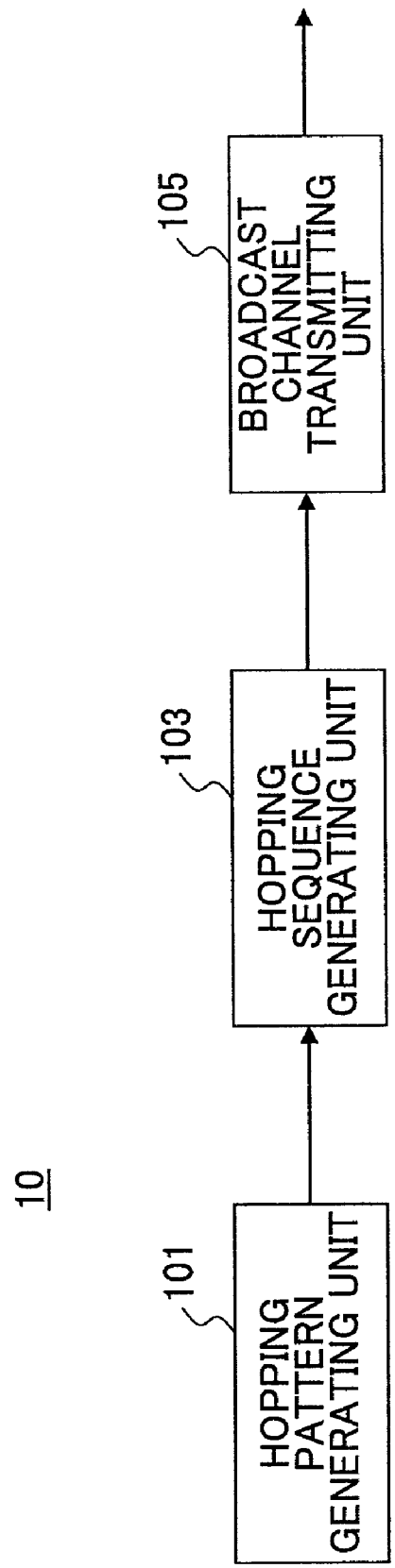
FIG. 10 shows a block diagram of a base station in accordance with an embodiment of the present invention.

With reference to FIG. 10, a configuration of a base station 10 in accordance with an embodiment of the present invention is described below.

The base station 10 includes a hopping pattern generating unit 101, a hopping sequence generating unit 103, and a broadcast channel transmitting unit 105.

The hopping pattern generating unit 101 generates an arbitrary hopping pattern H(y).

The hopping sequence generating unit 103 generates a hopping sequence F(x,y) by applying an offset 'x' to the hopping pattern H(y).

The broadcast channel transmitting unit 105 transmits information about the hopping sequence as broadcast information. Assuming that thirty types of CAZAC sequences are available, when seventeen hopping patterns are defined so as to generate 510 types of hopping sequences, the broadcast channel transmitting unit 105 may transmit nine bits of information to represent 510 types of hopping sequences. When the base station 10 has a configuration of plural sectors, the broadcast channel transmitting unit 105 may further transmit one bit of information to indicate whether the same hopping sequence is used for the Demodulation Reference Signal in the sectors of the same base station.

<Configuration of a User Equipment Terminal>

Figure 11:
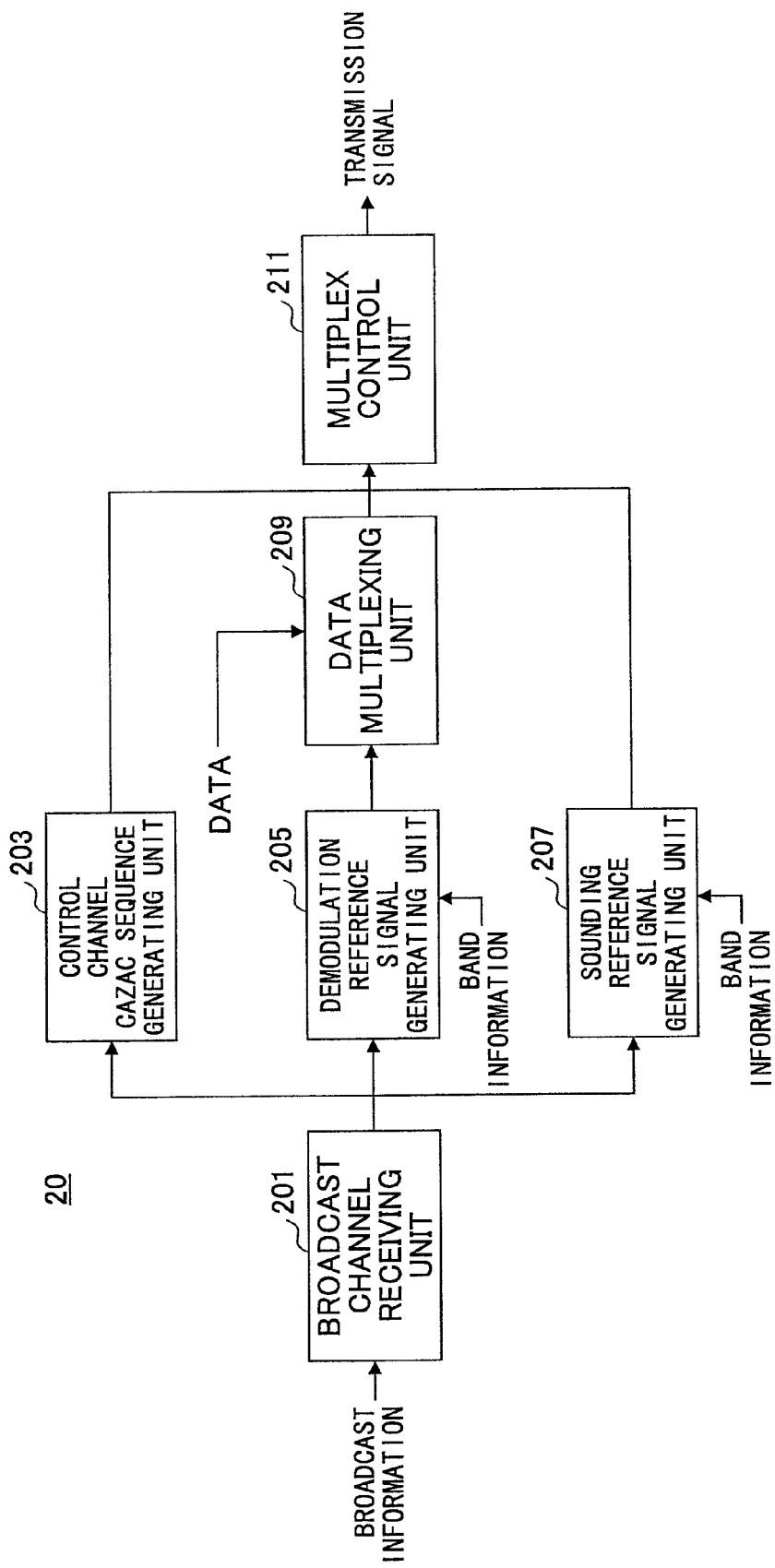
FIG. 11 shows a block diagram of a user equipment terminal in accordance with an embodiment of the present invention.

With reference to FIG. 11, a user equipment terminal 20 in accordance with an embodiment of the present invention is described below.

The user equipment terminal 20 includes a broadcast channel receiving unit 201, a control channel CAZAC sequence generating unit 203, a Demodulation Reference Signal generating unit 205, a Sounding Reference Signal generating unit 207, a data multiplexing unit 209, and a multiplex control unit 211.

The broadcast channel receiving unit 201 retrieves a hopping sequence from broadcast information transmitted from the base station. The broadcast channel receiving unit 201 may retrieve the hopping sequence from the combination of broadcast information transmitted from the base station and a cell-specific number (a number uniquely assigned to the cell).

The control channel CAZAC sequence generating unit 203 generates a CAZAC sequence for the control channel according to the received hopping sequence.

The Demodulation Reference signal generating unit 205 generates a CAZAC sequence for the Demodulation Reference Signal according to a sequence formed by puncturing the received hopping sequence.

The Sounding Reference signal generating unit 207 generates a CAZAC sequence for the Sounding Reference Signal according to a sequence formed by puncturing the received hopping sequence.

The Demodulation Reference Signal is multiplexed with user data by the data multiplexing unit 209, multiplexed with the control channel and the Sounding Reference Signal by the multiplexed control unit 211, and then transmitted to the base station.

<Flowchart of a Signal Sequence Generating Method>

With reference to FIG. 12, a signal sequence generating method in accordance with an embodiment of the present invention is described below.

First, the base station generates a predetermined hopping pattern H(y) (S101). Then, the base station generates a hopping sequence F(x,y) by applying an offset 'x' to the hopping pattern H(y) (S103). When the base station has a configuration of plural sectors, the base station may generate information indicating whether the same hopping sequence is used for the Demodulation Reference Signal in the sectors of the same base station (S105). The hopping sequence F(x,y) is transmitted as broadcast information to the user equipment terminal, together with the information indicating whether the same hopping sequence is used for the Demodulation Reference Signal.

The user equipment terminal receives the hopping sequence F(x,y) and generates a CAZAC sequence for the control channel according to the hopping sequence F(x,y) (S107). In addition, the user equipment terminal generates, the Demodulation Reference Signal according to a pattern formed by puncturing the hopping sequence F(x,y) (S109). When the base station has a configuration of plural sectors, the same Demodulation Reference Signal may be generated among the sectors. Furthermore, the user equipment terminal generates the Sounding Reference Signal according to a pattern formed by puncturing the hopping sequence F(x,y).

As described above, according to an embodiment of the invention, a CAZAC sequence can be efficiently assigned to each cell. While the present invention is described with reference to the preferred embodiments of the present invention, the present invention is not limited to these embodiments but may be modified or changed within the scope of the claims. For example, the present invention is applicable to any mobile communication system in which a signal sequence which is orthogonal among cells is selected from a limited number of signal sequences. Furthermore, while the present invention is described using the example of the CAZAC sequence as the signal sequence, the present invention is applicable to any other signal sequence.

This international patent application is based on Japanese Priority Application No. 2007-258111 filed on Oct. 1, 2007, the entire contents of which are incorporated herein by reference.

The invention claimed is:

1. A user equipment terminal for transmitting an uplink signal to a base station apparatus, comprising:
   a retrieving unit configured to retrieve, based on a cell-specific number, a hopping pattern expressed as:

$$H(y)=\{h_{y,1},h_{y,2},h_{y,3},\ldots,h_{y,N}\}$$

where '$h_{y,n}$' is any integer within a range of 0 to (X−1), 'y' is a hopping pattern index, 'N' is a length of the hopping pattern, and 'X' is the number of available Constant Amplitude Zero Auto-Correlation (CAZAC) sequence types, and retrieve a hopping sequence expressed as:

$$F(x,y)=\{(h_{y,1}+x)\bmod(X),(h_{y,2}+x)\bmod(X),(h_{y,3}+x)\bmod(X),\ldots,(h_{y,N}+x)\bmod(X)\}$$

where 'x' is an offset;
   a generating unit configured to select the values:

$$(h_{y,1}+x)\bmod(X),(h_{y,2}+x)\bmod(X),(h_{y,3}+x)\bmod(X),\ldots,(h_{y,N}+x)\bmod(X)$$

of the hopping sequence in order, in which an identification number is added in advance to each CAZAC sequence, and generate a reference signal using a CAZAC sequence in order, by identifying the CAZAC sequence using the selected value as the identification number; and
   a transmitting unit configured to transmit the reference signal generated by the generating unit.

2. The user equipment terminal as claimed in claim 1, wherein the retrieving unit defines seventeen types of hopping patterns and uses one of the hopping patterns based on the cell-specific number.

3. The user equipment terminal as claimed in claim 1, wherein the retrieving unit is able to use thirty types of offsets.

4. The user equipment terminal as claimed in claim 1, wherein the retrieving unit disables hopping when the hopping is not needed.

5. A transmission method in a user equipment terminal for transmitting an uplink signal to a base station apparatus, comprising the steps of:
   retrieving based on a cell-specific number, a hopping pattern expressed as:

$$H(y)=\{h_{y,1},h_{y,2},h_{y,3},\ldots,h_{y,N}\}$$

where '$h_{y,n}$' is any integer within a range of 0 to (X−1), 'y' is a hopping pattern index, 'N' is a length of the hopping pattern, and 'X' is the number of available Constant Amplitude Zero Auto-Correlation (CAZAC) sequence types, and retrieving a hopping sequence expressed as:

$$F(x,y)=\{(h_{y,1}+x)\bmod(X),(h_{y,2}+x)\bmod(X),(h_{y,3}+x)\bmod(X),\ldots,(h_{y,N}+x)\bmod(X)\}$$

where 'x' is an offset;
   selecting the values:

$$(h_{y,1}+x)\bmod(X),(h_{y,2}+x)\bmod(X),(h_{y,3}+x)\bmod(X),\ldots,(h_{y,N}+x)\bmod(X)$$

of the hopping sequence in order, in which an identification number is added in advance to each CAZAC sequence, and generating a reference signal using a CAZAC sequence in order, by identifying the CAZAC sequence using the selected value as the identification number; and
   transmitting the generated reference signal.

6. A communication system comprising:
   a user equipment terminal for transmitting an uplink signal to a base station apparatus; and a base station apparatus for receiving the uplink signal from the user equipment terminal; the user equipment terminal including a retrieving unit configured to retrieve, based on a cell-specific number, a hopping pattern expressed as:

$$H(y)=\{h_{y,1},h_{y,2},h_{y,3},\ldots,h_{y,N}\}$$

where '$h_{y,n}$' is any integer within a range of 0 to (X−1), 'y' is a hopping pattern index, 'N' is a length of the hopping pattern, and 'X' is the number of available Constant Amplitude Zero Auto-Correlation (CAZAC) sequence types, and retrieve a hopping sequence expressed as:

$$F(x,y)=\{(h_{y,1}+x)\bmod(X),(h_{y,2}+x)\bmod(X),(h_{y,3}+x)\bmod(X),\ldots,(h_{y,N}+x)\bmod(X)\}$$

where 'x' is an offset;
   a generating unit configured to select the values:

$$(h_{y,1}+x)\bmod(X),(h_{y,2}+x)\bmod(X),(h_{y,3}+x)\bmod(X),\ldots,(h_{y,N}+x)\bmod(X)$$

of the hopping sequence in order, in which an identification number is added in advance to each CAZAC sequence, and generate a reference signal using a CAZAC sequence in order, by identifying the CAZAC sequence using the selected value as the identification number;
   and a transmitting unit configured to transmit the reference signal generated by the generating unit.

* * * * *